US011248154B2

(12) United States Patent
Ishihara et al.

(10) Patent No.: US 11,248,154 B2
(45) Date of Patent: Feb. 15, 2022

(54) THERMOCONDUCTIVE SILICONE COMPOSITION

(71) Applicant: SHIN-ETSU CHEMICAL CO., LTD., Tokyo (JP)

(72) Inventors: Yasuhisa Ishihara, Annaka (JP); Akihiro Endo, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 64 days.

(21) Appl. No.: 16/342,785

(22) PCT Filed: Oct. 5, 2017

(86) PCT No.: PCT/JP2017/036305
§ 371 (c)(1),
(2) Date: Apr. 17, 2019

(87) PCT Pub. No.: WO2018/074247
PCT Pub. Date: Apr. 26, 2018

(65) Prior Publication Data
US 2019/0256756 A1 Aug. 22, 2019

(30) Foreign Application Priority Data

Oct. 18, 2016 (JP) .............................. JP2016-204276

(51) Int. Cl.
C09K 5/14 (2006.01)
C08G 77/04 (2006.01)
C08K 3/22 (2006.01)
C08K 3/28 (2006.01)
C08K 7/18 (2006.01)
C08L 83/04 (2006.01)
C08K 13/04 (2006.01)
C08K 3/013 (2018.01)
C08K 13/00 (2006.01)

(52) U.S. Cl.
CPC ............... C09K 5/14 (2013.01); C08G 77/04 (2013.01); C08K 3/013 (2018.01); C08K 3/22 (2013.01); C08K 3/28 (2013.01); C08K 7/18 (2013.01); C08K 13/00 (2013.01); C08K 13/04 (2013.01); C08L 83/04 (2013.01); C08K 2003/2227 (2013.01); C08K 2003/282 (2013.01); C08K 2201/001 (2013.01); C08K 2201/005 (2013.01); C08K 2201/014 (2013.01)

(58) Field of Classification Search
CPC ... C09K 5/14; C09K 5/00; C08K 3/00; C08K 3/013; C08K 3/28; C08K 2003/282; C08K 3/20; C08K 2003/2227; C08K 13/00; C08K 13/04
USPC ........................................................ 252/75
See application file for complete search history.

(56) References Cited

U.S. PATENT DOCUMENTS

| 4,292,225 | A | * | 9/1981 | Theodore | ............... | C08L 83/04 524/188 |
|---|---|---|---|---|---|---|
| 5,011,870 | A | * | 4/1991 | Peterson | .................. | C08K 3/00 523/220 |
| 5,344,635 | A | | 9/1994 | Bujard et al. | | |
| 6,136,758 | A | * | 10/2000 | Yamada | ............... | C10M 169/00 508/172 |
| 6,255,738 | B1 | * | 7/2001 | Distefano | ............... | H01L 23/24 257/787 |
| 7,510,998 | B2 | * | 3/2009 | Yamada | ............... | C10M 111/04 508/150 |
| 8,017,684 | B2 | * | 9/2011 | Endo | .................... | C10M 169/02 524/588 |
| 8,334,054 | B2 | * | 12/2012 | Endo | .................... | C09D 183/04 428/447 |
| 8,618,211 | B2 | * | 12/2013 | Bhagwagar | ............... | C09K 5/14 524/588 |
| 9,385,063 | B2 | * | 7/2016 | Ishihara | ............... | H01L 23/3672 |
| 10,370,575 | B2 | * | 8/2019 | Ishihara | .................. | C09K 5/14 |
| 10,647,830 | B2 | * | 5/2020 | Ito | ............................. | C08K 3/28 |
| 10,676,587 | B2 | * | 6/2020 | Endo | ........................ | C08L 83/06 |
| 2010/0006798 | A1 | * | 1/2010 | Endo | ........................ | C09K 5/14 252/78.3 |
| 2015/0037575 | A1 | | 2/2015 | Sakaguchi et al. | | |
| 2015/0122422 | A1 | | 5/2015 | Hayasaka et al. | | |
| 2015/0361320 | A1 | * | 12/2015 | Tang | ........................ | C09K 5/08 427/397.7 |
| 2017/0081579 | A1 | * | 3/2017 | Fujikawa | .................. | C09K 5/14 |
| 2017/0210964 | A1 | * | 7/2017 | Ito | ............................. | C08K 3/24 |
| 2018/0192547 | A1 | * | 7/2018 | Nishio | .................. | B32B 27/283 |

(Continued)

FOREIGN PATENT DOCUMENTS

EP 2308676 A1 4/2011
EP 3 020 779 A1 5/2016
(Continued)

OTHER PUBLICATIONS

International Search Report, issued in PCT/JP2017/036305, PCT/ISA/210, dated Jan. 16, 2018.
Written Opinion of the International Searching Authority, issued in PCT/JP2017/036305, PCT/ISA/237, dated Jan. 16, 2018.
Extended European Search Report dated Apr. 21, 2020, in European Patent Application No. 17862226.2.
Taiwanese Office Action and Search Report for Taiwanese Application No. 106135610, dated May 11, 2021.
Korean Office Action for Korean Application No. 10-2019-7013932, dated Aug. 23, 2021.

Primary Examiner — Jane L Stanley
(74) Attorney, Agent, or Firm — Birch, Stewart, Kolasch & Birch, LLP

(57) ABSTRACT

A thermoconductive silicone composition which has (A) an organopolysiloxane as a base polymer and includes (B) a thermoconductive filler, wherein the thermoconductive filler is 60-85 vol % of the thermoconductive silicone composition, and 40-60 vol % of the thermoconductive filler is aluminum nitride having an average particle diameter of at least 50 μm.

12 Claims, No Drawings

(56) References Cited

U.S. PATENT DOCUMENTS

| | | | | |
|---|---|---|---|---|
| 2019/0292349 A1* | 9/2019 | Ito | ............................ | C08K 3/22 |
| 2019/0316018 A1* | 10/2019 | Ito | ............................ | C09J 11/04 |
| 2020/0123427 A1* | 4/2020 | Endo | ..................... | H01L 23/373 |
| 2020/0181334 A1* | 6/2020 | Ishihara | ................... | C08K 7/18 |

FOREIGN PATENT DOCUMENTS

| | | |
|---|---|---|
| EP | 3467044 A1 | 4/2019 |
| JP | 6-164174 A | 6/1994 |
| JP | 2000-86213 A | 3/2000 |
| JP | 2001-28414 A | 1/2001 |
| JP | 3256587 B2 | 2/2002 |
| JP | 2002-299533 A | 10/2002 |
| JP | 2005-228955 A | 8/2005 |
| JP | 3957596 B2 | 8/2007 |
| JP | 2009-179771 A | 8/2009 |
| JP | 4357064 B2 | 11/2009 |
| JP | 2011-98566 A | 5/2011 |
| JP | 2011-249682 A | 12/2011 |
| JP | 2015-90897 A | 5/2015 |
| JP | 2015-201573 A | 11/2015 |
| JP | 2016-11322 A | 1/2016 |
| JP | 2017-210518 A | 11/2017 |
| JP | 6246986 B1 | 12/2017 |
| WO | WO 2013/145961 A1 | 10/2013 |
| WO | WO 2016/190189 A1 | 12/2016 |
| WO | WO 2017/126608 A1 | 7/2017 |

* cited by examiner

THERMOCONDUCTIVE SILICONE COMPOSITION

TECHNICAL FIELD

This invention generally relates to a heat conductive material which is inserted between a thermal boundary of a heat-generating electronic part and a heat-dissipating member such as a heat sink or circuit board for cooling the electronic part via heat transfer.

BACKGROUND ART

LSI chips such as CPU, driver IC and memories are used in electronic equipment such as personal computers, digital video disks, and mobile phones. As these chips are tailored for higher performance, higher speed of operation, size reduction and higher integration, they themselves generate greater amounts of heat. Elevated temperatures of the chips by their own heat cause malfunction and failure to the chips themselves. To suppress a temperature rise of chips during operation, many heat-dissipating methods and heat-dissipating members used therefore have been proposed.

In prior art electronic equipment, heat sinks in the form of aluminum, copper and similar metal plates having a high thermal conductivity are used for suppressing a temperature rise of chips during operation. The heat sink conducts the heat generated by the chip and releases the heat from its surface by virtue of a temperature difference from the ambient air. For efficient conduction of the heat generated by the chip to the heat sink, the heat sink must be placed in close contact with the chip. Because of difference in chip dimensions and tolerances associated with assembly, a flexible sheet or grease is interposed between the chip and the heat sink, thereby establishing a way for heat conduction from the chip to the heat sink via the sheet or grease.

Since sheets are easier to handle than grease, heat-conductive sheets made of heat-conductive silicone rubber or the like (i.e., heat-conductive silicone rubber sheets) are used in a variety of applications. The heat-conductive sheet is often used when there exists a certain space between a heat-generating element and a cooling site such as a heat sink or casing. In most cases, electric insulation must be established between the heat-generating element and the heat sink or casing. Thus the heat-conductive sheet is often required to be insulating. This inhibits the use of metal particles such as aluminum, copper and silver as the heat-conductive filler, and insulating heat-conductive fillers such as aluminum hydroxide and aluminum oxide are often used.

However, since aluminum hydroxide and aluminum oxide themselves have a low thermal conductivity, heat-conductive silicone compositions using such heat-conductive filler have a low thermal conductivity. Under the recent circumstances, the amount of heat generated from a heat-generating element is ever increasing, and the heat-conductive sheet is required to have a higher thermal conductivity. The requirement is no longer met by using aluminum hydroxide or aluminum oxide as the heat-conductive filler.

PRIOR ART DOCUMENTS

Patent Documents

Patent Document 1: JP 3256587
Patent Document 2: JP 3957596
Patent Document 3: JP-A H06-164174
Patent Document 4: JP 4357064

SUMMARY OF INVENTION

Technical Problem

For further enhancing thermal conductivity, attention is recently paid to boron nitride and aluminum nitride. Although boron nitride has a very high thermal conductivity, boron nitride particles are of flat shape so that the thermal conductivity is different between thickness and length directions. For this reason, a silicone polymer composition filled with boron nitride exhibits anisotropic heat conduction. On the other hand, aluminum nitride particles are not of flat shape, and a composition filled with aluminum nitride is unlikely to exhibit anisotropic heat conduction. It is also known that aluminum nitride is easier to fill in a silicone polymer than boron nitride.

Solution to Problem

Making extensive investigations to attain the above object, the inventors have found that a heat-conductive silicone composition which cures into a cured product having a high thermal conductivity is obtainable by using 60 to 85% by volume of a heat-conductive filler and constructing 40 to 60% by volume of the heat-conductive filler from aluminum nitride having an average particle size of at least 50 μm. The invention is predicated on this finding.

The invention is defined below.

[1] A heat-conductive silicone composition comprising (A) an organopolysiloxane as a base polymer and (B) a heat-conductive filler, wherein the heat-conductive filler (B) accounts for 60 to 85% by volume of the heat-conductive silicone composition, and aluminum nitride having an average particle size of at least 50 μm accounts for 40 to 60% by volume of the heat-conductive filler.

[2] The heat-conductive silicone composition of [1] wherein the aluminum nitride is unsintered crushed aluminum nitride.

[3] The heat-conductive silicone composition of [1] or [2] wherein relative to the total volume of the aluminum nitride as the heat-conductive filler which is 1, aluminum nitride having an average particle size of 50 μm to less than 70 μm is present in a volume ratio between 0.5 and 0.6, and aluminum nitride having an average particle size of 70 μm to 90 μm is present in a volume ratio between 0.4 and 0.5.

[4] The heat-conductive silicone composition of any one of [1] to [3] wherein a heat-conductive filler having an average particle size of up to 5 μm accounts for 25 to 45% by volume of the heat-conductive filler.

[5] The heat-conductive silicone composition of [4] wherein the heat-conductive filler having an average particle size of up to 5 μm is aspherical aluminum oxide.

[6] The heat-conductive silicone composition of [1], comprising
(A) 100 parts by weight of the organopolysiloxane,
(B-I) 1,100 to 1,400 parts by weight of aluminum nitride having an average particle size of 50 μm to less than 70 μm,
(B-II) 900 to 1,200 parts by weight of aluminum nitride having an average particle size of 70 μm to 90 μm,
(B-III) 650 to 800 parts by weight of aluminum oxide having an average particle size of 5 μm to 15 μm, and
(B-IV) 1,300 to 1,700 parts by weight of aluminum oxide having an average particle size of 0.5 μm to less than 5 μm or aluminum hydroxide having an average particle size of 0.5 μm to less than 5 μm.

[7] The heat-conductive silicone composition of [6] wherein component (B-I) is unsintered crushed aluminum nitride having an average particle size of 50 μm to less than 70 μm, component (B-II) is unsintered crushed aluminum nitride having an average particle size of 70 μm to 90 μm or sintered spherical aluminum nitride having an average particle size of 70 μm to 90 μm, component (B-III) is spherical aluminum oxide having an average particle size of 5 μm to 15 μm, and component (B-IV) is crushed aluminum oxide having an average particle size of 0.5 μm to less than 5 μm or aluminum hydroxide having an average particle size of 0.5 μm to less than 5 μm.

[8] The heat-conductive silicone composition of any one of [1] to [7], further comprising (C) at least one compound selected from components (C-1) and (C-2), in an amount of 10 to 160 parts by weight per 100 parts by weight of component (A), (C-1) an alkoxysilane compound having the general formula (1):

$$R^1_a R^2_b Si(OR^3)_{4-a-b} \quad (1)$$

wherein $R^1$ is independently a $C_6$-$C_{15}$ alkyl group, $R^2$ is independently a substituted or unsubstituted $C_1$-$C_8$ monovalent hydrocarbon group, $R^3$ is independently a $C_1$-$C_6$ alkyl group, a is an integer of 1 to 3, b is an integer of 0 to 2, and a+b is an integer of 1 to 3, (C-2) a dimethylpolysiloxane capped with a trialkoxy group at one end of the molecular chain, having the general formula (2):

[Chem. 1]

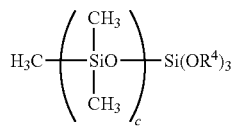

(2)

wherein $R^4$ is independently a $C_1$-$C_6$ alkyl group and c is an integer of 5 to 100.

[9] A cured product of the heat-conductive silicone composition of any one of [1] to [8], having a thermal conductivity of at least 8 W/mK.

[10] The cured product of [9], which has an Asker C hardness of up to 50.

[11] The cured product of [9] or [10], which has a dielectric breakdown voltage of at least 6 kV at a thickness of 1 mm.

[12] A method of preparing the heat-conductive silicone composition of [1] or [6], comprising the step of mixing (A) 100 parts by weight of the organopolysiloxane, (B-I) 1,100 to 1,400 parts by weight of aluminum nitride having an average particle size of 50 μm to less than 70 m, (B-II) 900 to 1,200 parts by weight of aluminum nitride having an average particle size of 70 μm to 90 μm, (B-III) 650 to 800 parts by weight of aluminum oxide having an average particle size of 5 μm to 15 μm, and (B-IV) 1,300 to 1,700 parts by weight of aluminum oxide having an average particle size of 0.5 μm to less than 5 μm or aluminum hydroxide having an average particle size of 0.5 μm to less than 5 μm.

Advantageous Effects of Invention

The heat-conductive silicone composition of the invention cures into a cured product having a high thermal conductivity.

DESCRIPTION OF EMBODIMENTS

Now the invention is described in detail. The invention is directed to a heat-conductive silicone composition comprising an organopolysiloxane as a base polymer and a heat-conductive filler. The heat-conductive filler accounts for 60 to 85% by volume of the heat-conductive silicone composition, and aluminum nitride having an average particle size of at least 50 μm accounts for 40 to 60% by volume of the heat-conductive filler.

[(A) Organopolysiloxane]

The organopolysiloxane used herein as a base polymer is not particularly limited in type. The organopolysiloxane generally has a backbone composed mainly of repeating diorganosiloxane units although it may contain a branched structure as a part of the molecule structure or have a cyclic structure. Inter alia, a linear diorganopolysiloxane is preferred from the aspect of physical properties such as mechanical strength of the cured product. The organopolysiloxane may be end-capped with a triorganosiloxy or diorganohydroxysilyl group. The organopolysiloxane may be used alone or in combination of two or more organopolysiloxanes having different kinematic viscosity.

The organopolysiloxane contains silicon-bonded organic groups, examples of which include substituted or unsubstituted monovalent hydrocarbon groups which may contain an intervening oxygen atom. Examples include alkyl groups such as methyl, ethyl, propyl, isopropyl, butyl, isobutyl, tert-butyl, pentyl, neopentyl, hexyl, heptyl, octyl, nonyl, decyl and dodecyl, cycloalkyl groups such as cyclopentyl, cyclohexyl and cycloheptyl, alkenyl groups such as vinyl, allyl, propenyl, isopropenyl, butenyl, hexenyl and cyclohexenyl, aryl groups such as phenyl, tolyl, xylyl, naphthyl and biphenylyl, aralkyl groups such as benzyl, phenylethyl, phenylpropyl and methylbenzyl, substituted forms of the foregoing groups in which one or more or even all carbon-bonded hydrogen atoms are substituted by halogen atoms (e.g., fluorine, chlorine and bromine), cyano or the like, such as chloromethyl, 2-bromoethyl, 3-chloropropyl, 3,3,3-trifluoropropyl, chlorophenyl, fluorophenyl, cyanoethyl and 3,3,4,4,5,5,6,6,6-nonafluorohexyl, and alkoxy groups such as methoxy, ethoxy and propoxy. Typical monovalent hydrocarbon groups have 1 to 10 carbon atoms, more typically 1 to 6 carbon atoms. Preferred are substituted or unsubstituted $C_1$-$C_3$ alkyl groups such as methyl, ethyl, propyl, chloromethyl, bromoethyl, 3,3,3-trifluoropropyl and cyanoethyl, lower alkenyl groups such as vinyl and allyl, and substituted or unsubstituted phenyl groups such as phenyl, chlorophenyl and fluorophenyl. All silicon-bonded organic groups may be the same or different.

The organopolysiloxane preferably has a kinematic viscosity at 25° C. in the range of 10 to 30,000 mm²/s, more preferably in the range of 50 to 1,000 mm²/s. If an organopolysiloxane having a higher viscosity is used, the resulting composition may become less flowing and difficult to load with the heat-conductive filler. Notably, the kinematic viscosity is measured by an Ostwald viscometer (the same applies hereinafter).

The amount of component (A) blended is preferably 3 to 30% by volume, more preferably 5 to 20% by volume of the heat-conductive silicone composition.

[(B) Heat-Conductive Filler]

Suitable heat-conductive fillers used herein include substances commonly referred to as heat-conductive filler, for example, nonmagnetic metals such as copper and aluminum, metal oxides such as aluminum oxide, silica, magnesia, red iron oxide, beryllia, titania and zirconia, metal nitrides such as aluminum nitride, silicon nitride and boron nitride, metal hydroxides such as magnesium hydroxide, synthetic diamond, and silicon carbide. The heat-conductive filler preferably has a particle size of 0.1 to 200 μm and may be used alone or in combination of two or more as long as the requirement of the invention is met. It is noted that the particle size of the heat-conductive filler is measured by a laser diffraction/scattering mode particle size distribution analyzer, for example, Microtrac MT3300EX (Nikkiso Co., Ltd.). The average particle size is such a value on volume basis that when the volume distribution of particles measured is divided into two portions at the average particle size, the amount of particles larger than the average particle size is equal to the amount of particles smaller than the average particle size (the same applies hereinafter).

[Aluminum Nitride]

According to the invention, aluminum nitride having an average particle size of at least 50 μm accounts for 40 to 60% by volume, preferably 45 to 55% by volume of the heat-conductive filler. The aluminum nitride has an average particle size of at least 50 μm, preferably from 50 μm to 200 μm, and more preferably from 60 μm to 200 μm. If aluminum nitride having an average particle size of 50 μm or smaller is used in a large amount, loading is difficult. As discussed above, provided that the amount of filler loaded is the same, a composition loaded with a larger size filler has a higher thermal conductivity. Thus, particles having as large an average particle size as possible are used. However, if particles have an average particle size in excess of 200 μm, the addition of such particles to a composition may detract from the flow thereof. As long as the average particle size is within the above range, the aluminum nitride may be either crushed or spherical particles, with the crushed particles being preferred. Notably, any well-known crushed or spherical particles may be used.

Aluminum nitride is generally classified to a sintered one and an unsintered one. With respect to loading of organopolysiloxane, the sintered aluminum nitride in the form of spherical particles is more effective than the unsintered aluminum nitride in the form of crushed particles. On the other hand, the heat conduction of the sintered particles is inferior to that of the unsintered particles because a few percent of a rare earth element oxide such as yttria is added as a sintering aid during sintering, resulting in a mixture of aluminum nitride and sintering aid phases. Moreover, the sintered particles are very expensive because of sintering step. Therefore unsintered aluminum nitride is preferred for use as the heat-conductive filler.

Relative to the total volume of the aluminum nitride as the heat-conductive filler which is 1, aluminum nitride having an average particle size of from 50 μm to less than 70 μm is preferably present in a volume ratio between 0.5 and 0.62, more preferably between 0.52 and 0.6, and aluminum nitride having an average particle size of 70 μm to 90 μm is preferably present in a volume ratio between 0.4 and 0.5, more preferably between 0.42 and 0.48.

[Aluminum Oxide]

The aluminum oxide (or alumina) may be either spherical or aspherical. The aspherical aluminum oxide includes crushed particles and round particles. The aspherical aluminum oxide is more preferable because it is cheaper than the spherical aluminum oxide and makes the resulting composition competitively priced.

It is noted that a heat-conductive filler having an average particle size of up to 5 μm preferably accounts for 25 to 45% by volume, more preferably 30 to 45% by volume of the heat-conductive filler. Preferably the heat-conductive filler having an average particle size of up to 5 μm is aluminum oxide, more preferably aspherical aluminum oxide.

The amount of component (B) blended is 60 to 85% by volume, preferably 75 to 85% by volume of the heat-conductive silicone composition. A smaller amount of component (B) fails to gain a sufficient thermal conductivity whereas an excessive amount is difficult to blend. For example, the amount of component (B) is suitably selected in the range of 1,000 to 8,000 parts by weight, or 3,000 to 6,000 parts by weight per 100 parts by weight of component (A).

An exemplary combination of components (A) and (B) is given below.

One exemplary combination is a heat-conductive silicone composition comprising (A) 100 parts by weight of an organopolysiloxane, (B-I) 1,100 to 1,400 parts by weight of aluminum nitride having an average particle size of 50 μm to less than 70 μm, (B-II) 900 to 1,200 parts by weight of aluminum nitride having an average particle size of 70 μm to 90 μm, (B-III) 650 to 800 parts by weight of aluminum oxide having an average particle size of 5 μm to 15 μm, and (B-IV) 1,300 to 1,700 parts by weight of aluminum oxide having an average particle size of 0.5 μm to less than 5 μm or aluminum hydroxide having an average particle size of 0.5 μm to less than 5 μm.

Inter alia, the combination of components (A) and (B) shown below is preferred.

One preferred combination is a heat-conductive silicone composition comprising (A) 100 parts by weight of an organopolysiloxane, (B-I) 1,100 to 1,400 parts by weight of unsintered crushed aluminum nitride having an average particle size of 50 μm to less than 70 μm, (B-II) 900 to 1,200 parts by weight of unsintered crushed aluminum nitride having an average particle size of 70 μm to 90 μm or sintered spherical aluminum nitride having an average particle size of 70 μm to 90 μm (B-III) 650 to 800 parts by weight of spherical aluminum oxide having an average particle size of 5 μm to 15 μm, and (B-IV) 1,300 to 1,700 parts by weight of crushed aluminum oxide having an average particle size of 0.5 μm to less than 5 μm or aluminum hydroxide having an average particle size of 0.5 μm to less than 5 μm.

The preferred component (B-II) is unsintered crushed aluminum nitride having an average particle size of 70 μm to 90 μm, and the preferred component (B-IV) is crushed aluminum oxide having an average particle size of 0.5 μm to less than 5 μm. In this case, the amount of component (B-IV) blended is more preferably 1,500 to 1,700 parts by weight. The preferred component (A) is component (A-I) or (A-II) to be described later.

[Component (C)]

The heat-conductive composition of the invention may comprise (C) a surface treating agent for the purposes of treating the heat-conductive filler (B) to be hydrophobic during preparation of the composition, improving the wettability of the filler to the organopolysiloxane as component (A), and uniformly dispersing the filler in the matrix of component (A). Component (C) is preferably selected from the following components (C-1) and (C-2), which may be used alone or in combination of two or more.

(C-1) Alkoxysilane compound having the general formula (1)

$$R^1_a R^2_b Si(OR^3)_{4-a-b} \tag{1}$$

Herein $R^1$ is independently a $C_6$-$C_{15}$ alkyl group, $R^2$ is independently a substituted or unsubstituted $C_1$-$C_8$ monovalent hydrocarbon group, $R^3$ is independently a $C_1$-$C_6$ alkyl group, a is an integer of 1 to 3, b is an integer of 0 to 2, and a+b is an integer of 1 to 3.

In formula (1), examples of the alkyl group represented by $R^1$ include hexyl, octyl, nonyl, decyl, dodecyl, and tetradecyl. When the carbon count of the alkyl group represented by $R^1$ is in a range of 6 to 15, component (C) has fully improved wettability, is easy to handle, and provides the composition with good low-temperature properties.

Examples of the substituted or unsubstituted $C_1$-$C_8$ monovalent hydrocarbon group represented by $R^2$ include alkyl groups such as methyl, ethyl, propyl, isopropyl, butyl, isobutyl, tert-butyl, pentyl, neopentyl, hexyl, heptyl and octyl, cycloalkyl groups such as cyclopentyl, cyclohexyl and cycloheptyl, aryl groups such as phenyl and tolyl, aralkyl groups such as benzyl and phenylethyl, and substituted forms of the foregoing groups in which one or more or even all carbon-bonded hydrogen atoms are substituted by halogen atoms (e.g., fluorine, chlorine and bromine), cyano or the like, such as chloromethyl, 2-bromoethyl, 3-chloropropyl, 3,3,3-trifloropropyl, chlorophenyl, fluorophenyl, cyanoethyl, and 3,3,4,4,5,5,6,6-nonafluorohexyl, which may be used alone or in admixture of two or more. Of these, the substituted or unsubstituted $C_1$-$C_6$ monovalent hydrocarbon groups, for example, substituted or unsubstituted $C_1$-$C_3$ alkyl groups such as methyl, ethyl, propyl, chloromethyl, bromoethyl, 3,3,3-trifluoropropyl and cyanoethyl, and substituted or unsubstituted phenyl groups such as phenyl, chlorophenyl and fluorophenyl are preferred.

Preferred examples of component (C-1) are given below.

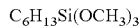

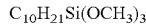

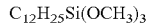

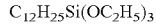

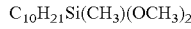

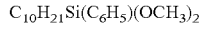

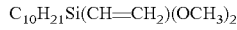

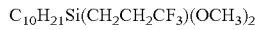

(C-2) Dimethylpolysiloxane capped with a trialkoxy group at one end of the molecular chain, represented by the general formula (2)

[Chem. 2]

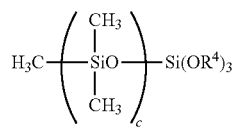

(2)

Herein $R^4$ is independently a $C_1$-$C_6$ alkyl group and c is an integer of 5 to 100.

In formula (2), examples of the alkyl group represented by $R^4$ include those groups of 1 to 6 carbon atoms among the examples of the alkyl group represented by $R^2$ in formula (1).

Preferred examples of component (C-2) are given below.

[Chem. 3]

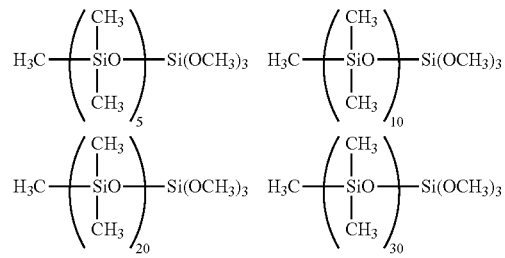

Either one or both of components (C-1) and (C-2) may be used. In this embodiment, the amount of component (C) is preferably 10 to 160 parts, more preferably 50 to 160 parts by weight per 100 parts by weight of component (A).

As mentioned above, the organopolysiloxane (A) used herein as the base polymer is not particularly limited in type. Since the curable heat-conductive silicone composition is implemented in the following three types, for each type, an appropriate one of organopolysiloxanes (A-I) to (A-III) described below is selected as the organopolysiloxane (A) or base polymer and combined with the heat-conductive filler (B). Each composition is described below in detail.

[1] Heat-conductive silicone composition of addition reaction cure type

[2] Heat-conductive silicone composition of organic peroxide cure type

[3] Heat-conductive silicone composition of condensation reaction cure type

[1] Heat-Conductive Silicone Composition of Addition Reaction Cure Type

In the embodiment wherein the composition is a heat-conductive silicone composition of addition reaction cure type which is cured through hydrosilylation reaction, preference is given to a composition comprising component (A-I) described below as the organopolysiloxane (A) or base polymer, the heat-conductive filler (B), and the following components (the preferred amounts of some components blended being also shown below), specifically (A-I) an organopolysiloxane containing at least two alkenyl groups per molecule, (B) the heat-conductive filler in an amount as described above, (D) an organohydrogenpolysiloxane containing at least two silicon-bonded hydrogen atoms, (E) a platinum group metal-based curing catalyst, (F) an addition reaction inhibitor, and optionally, (C) at least one compound selected from components (C-1) and (C-2) in an amount of 10 to 160 parts by weight per 100 parts by weight of component (A).

(A-I) Organopolysiloxane Containing at Least Two Alkenyl Groups per Molecule

Typically, the organopolysiloxane has a backbone composed mainly of repeating diorganosiloxane units although it may contain a branched structure as a part of the molecule structure or be a cyclic structure. From the aspect of physical properties such as mechanical strength of the cured product, a linear diorganopolysiloxane is preferred.

Typical silicon-bonded alkenyl groups include those having about 2 to about 8 carbon atoms such as vinyl, allyl, propenyl, isopropenyl, butenyl, hexenyl and cyclohexenyl. Of these, lower alkenyl groups such as vinyl and allyl are preferred, with vinyl being most preferred. The silicon-bonded alkenyl group may be present at the end of the molecular chain and/or at a non-terminal position of the molecular chain (i.e., side chain of the molecular chain) of the organopolysiloxane as component (A-I). The alkenyl groups are preferably attached at least to both ends of the molecular chain.

Besides the alkenyl group, the silicon-bonded organic groups include substituted or unsubstituted monovalent hydrocarbon groups which may have an intervening oxygen atom. Examples include alkyl groups such as methyl, ethyl, propyl, isopropyl, butyl, isobutyl, tert-butyl, pentyl, neopentyl, hexyl, heptyl, octyl, nonyl, decyl and dodecyl, cycloalkyl groups such as cyclopentyl, cyclohexyl and cycloheptyl, aryl groups such as phenyl, tolyl, xylyl, naphthyl and biphenylyl, aralkyl groups such as benzyl, phenylethyl, phenylpropyl and methylbenzyl, substituted forms of the foregoing groups in which one or more or even all carbon-bonded hydrogen atoms are substituted by halogen atoms (e.g., fluorine, chlorine and bromine), cyano or the like, such as chloromethyl, 2-bromoethyl, 3-chloropropyl, 3,3,3-trifloropropyl, chlorophenyl, fluorophenyl, cyanoethyl and 3,3,4,4,5,5,6,6,6-nonafluorohexyl, and alkoxy groups such as methoxy, ethoxy and propoxy. Typical monovalent hydrocarbon groups have 1 to 10 carbon atoms, more typically 1 to 6 carbon atoms. Preferred are substituted or unsubstituted $C_1$-$C_3$ alkyl groups such as methyl, ethyl, propyl, chloromethyl, bromoethyl, 3,3,3-trifluoropropyl and cyanoethyl, substituted or unsubstituted phenyl groups such as phenyl, chlorophenyl and fluorophenyl, and alkoxy groups such as methoxy. All silicon-bonded functional groups other than alkenyl group need not be identical.

[(B) Heat-Conductive Filler]

Component (B) used in the heat-conductive silicone composition of addition reaction cure type is the heat-conductive filler (B) defined above. The amount of component (B) is suitably selected within the range defined above. For example, it is suitably selected from the range of 1,000 to 8,000 parts by weight, or 3,000 to 6,000 parts by weight per 100 parts by weight of component (A-I).

[(D) Organohydrogenpolysiloxane]

Component (D) is an organohydrogenpolysiloxane containing at least two silicon-bonded hydrogen atoms. The organohydrogenpolysiloxane preferably contains on average at least two, more preferably 2 to 100 silicon-bonded hydrogen atoms (or Si—H groups) per molecule. Component (D) serves as a crosslinker for component (A-I). Addition reaction or hydrosilylation reaction between Si—H groups in component (D) and alkenyl groups in component (A-I) is promoted by (E) the platinum group metal-based curing catalyst described below, forming a three-dimensional network structure having crosslinks. If the number of Si—H groups is less than two, the material may not cure.

As component (D), an organohydrogenpolysiloxane having the general formula (3) is preferable.

[Chem. 4]

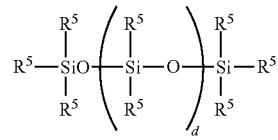

Herein $R^5$ is independently hydrogen or a substituted or unsubstituted monovalent hydrocarbon group free of aliphatic unsaturation, at least two of $R^5$ groups are hydrogen, and d is an integer of at least 1, preferably 1 to 100, and more preferably 2 to 50.

Examples of the substituted or unsubstituted monovalent hydrocarbon group free of aliphatic unsaturation (exclusive of hydrogen) represented by $R^5$ in formula (3) include alkyl groups such as methyl, ethyl, propyl, isopropyl, butyl, isobutyl, tert-butyl, pentyl, neopentyl, hexyl, heptyl, octyl, nonyl, decyl and dodecyl, cycloalkyl groups such as cyclopentyl, cyclohexyl and cycloheptyl, aryl groups such as phenyl, tolyl, xylyl, naphthyl and biphenylyl, aralkyl groups such as benzyl, phenylethyl, phenylpropyl and methylbenzyl, and substituted forms of the foregoing groups in which one or more or even all carbon-bonded hydrogen atoms are substituted by halogen atoms (e.g., fluorine, chlorine and bromine), cyano or the like, such as chloromethyl, 2-bromoethyl, 3-chloropropyl, 3,3,3-trifloropropyl, chlorophenyl, fluorophenyl, cyanoethyl and 3,3,4,4,5,5,6,6,6-nonafluorohexyl. Typical monovalent hydrocarbon groups have 1 to 10 carbon atoms, more typically 1 to 6 carbon atoms. Preferred are substituted or unsubstituted $C_1$-$C_3$ alkyl groups such as methyl, ethyl, propyl, chloromethyl, bromoethyl, 3,3,3-trifluoropropyl and cyanoethyl, and substituted or unsubstituted phenyl groups such as phenyl, chlorophenyl and fluorophenyl. All $R^5$ groups other than hydrogen need not be identical.

At least two, preferably 2 to 100, and more preferably 2 to 50 of $R^5$ groups are hydrogen atoms. The hydrogen atom may be present at the end of the molecular chain and/or at a non-terminal position of the molecular chain (i.e., side chain of the molecular chain).

Component (D) is added preferably in such an amount to provide 0.1 to 8 moles, more preferably 0.5 to 5 moles, and even more preferably 1 to 4 moles of Si—H groups in component (D) per mole of alkenyl groups in component (A-I). If the amount of Si—H groups in component (D) is less than 0.1 mole per mole of alkenyl groups in component (A-I), the material may not cure, or the cured product has insufficient strength, fails to maintain the shape as molded, and is difficult to handle. If the amount exceeds 8 moles, the cured product may suffer from a loss of flexibility and a significant increase of thermal resistance.

[(E) Platinum Group Metal-Based Curing Catalyst]

The platinum group metal-based curing catalyst as component (E) is an addition reaction catalyst for promoting addition reaction between alkenyl groups in component (A-I) and Si—H groups in component (D). It may be any of well-known catalysts for hydrosilylation reaction. Examples of the catalyst include platinum group metals alone such as platinum (including platinum black), rhodium and palladium; platinum chlorides, chloroplatinic acids and chloroplatinates such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$ and $Na_2HPtCl_4 \cdot nH_2O$, wherein n is an integer of 0 to 6, preferably 0 or 6; alcohol-modified chloroplatinic acids (see U.S. Pat. No.

3,220,972); chloroplatinic acid-olefin complexes (see U.S. Pat. Nos. 3,159,601, 3,159,662 and 3,775,452); supported catalysts comprising platinum group metals such as platinum black and palladium on supports of aluminum oxide, silica and carbon; rhodium-olefin complexes; chlorotris(triphenylphosphine)rhodium (known as Wilkinson's catalyst); and complexes of platinum chlorides, chloroplatinic acids and chloroplatinates with vinyl-containing siloxanes, specifically vinyl-containing cyclosiloxanes.

Component (D) may be used in a catalytic amount, which is typically about 0.1 to about 2,000 ppm of platinum group metal element based on the weight of component (A-I).

[(F) Addition Reaction Inhibitor]

If necessary, the heat-conductive silicone composition of addition reaction cure type may contain (F) an addition reaction inhibitor. Any well-known addition reaction inhibitors for conventional silicone compositions of addition reaction cure type may be used. Examples include acetylene compounds such as ethynyl methylidene carbinol, 1-ethynyl-1-hexanol, and 3-butyne-1-ol, nitrogen compounds, organic phosphorus compounds, oxime compounds, and organic chlorine compounds. The amount of the addition reaction inhibitor used is preferably 0.01 to 1 part by weight per 100 parts by weight of component (A-I).

[2] Heat-Conductive Silicone Composition of Organic Peroxide Cure Type

In the embodiment wherein the composition is a heat-conductive silicone composition of organic peroxide cure type which is cured through free radical reaction initiated by an organic peroxide, preference is given to a composition comprising component (A-II) described below as the organopolysiloxane (A) or base polymer, the heat-conductive filler (B), and the following components, specifically (A-II) an organopolysiloxane containing at least two silicon-bonded alkenyl groups per molecule, (B) the heat-conductive filler in an amount as described above, (G) an organic peroxide, and optionally, (C) at least one compound selected from components (C-1) and (C-2) in an amount of 10 to 160 parts by weight per 100 parts by weight of component (A).

[(A-II) Organopolysiloxane]

Although any organopolysiloxanes containing at least two silicon-bonded alkenyl groups per molecule may be used as component (A-II), an organopolysiloxane containing at least two alkenyl groups per molecule as exemplified above for component (A-I) is preferably used.

[(B) Heat-Conductive Filler]

Component (B) used in the heat-conductive silicone composition of organic peroxide cure type is the heat-conductive filler (B) defined above. The amount of component (B) is suitably selected within the range defined above. For example, it is suitably selected from the range of 1,000 to 8,000 parts by weight or 3,000 to 6,000 parts by weight per 100 parts by weight of component (A-II).

[(G) Organic Peroxide]

The organic peroxide as component (G) is decomposed under specific conditions to generate free radicals. Component (G) may be used alone or in a suitable combination of two or more.

Preferred examples include peroxyketals such as 1,1-di (tert-butylperoxy)cyclohexane and 2,2-di(4,4-di(tert-butylperoxy)cyclohexyl)propane, hydroperoxides such as p-menthane hydroperoxide and diisopropylbenzene hydroperoxide, dialkyl peroxides such as dicumyl peroxide and tert-butyl cumyl peroxide, diacyl peroxides such as dibenzoyl peroxide and disuccinic acid peroxide, peroxyesters such as tert-butyl peroxyacetate and tert-butyl peroxybenzoate, and peroxydicarbonates such as diisopropyl peroxydicarbonate. Peroxyketals, hydroperoxides, dialkyl peroxides and peroxyesters which have a relatively high decomposition temperature are preferred for handling and storage stability. The organic peroxide may be diluted with any organic solvent, hydrocarbon, liquid paraffin, inert solid or the like prior to use.

The amount of component (G) blended is preferably 0.01 to 10 parts, more preferably 0.1 to 5 parts by weight per 100 parts by weight of component (A-II).

[3] Heat-Conductive Silicone Composition of Condensation Reaction Cure Type

In the embodiment wherein the composition is a heat-conductive silicone composition of condensation reaction cure type which is cured through condensation reaction, preference is given to a composition comprising component (A-III) described below as the organopolysiloxane (A) or base polymer, the heat-conductive filler (B), and the following components, specifically (A-III) an organopolysiloxane capped at both ends with hydroxyl, having the general formula (4):

[Chem. 5]

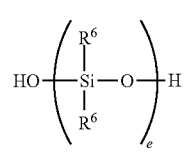

(4)

wherein $R^6$ which may be the same or different is an unsubstituted or halo or cyano-substituted $C_1$-$C_5$ alkyl group or $C_6$-$C_8$ aryl group and e is an integer of at least 1, (B) the heat-conductive filler, (H) at least one compound selected from silane compounds having the general formula (5), (partial) hydrolyzates and (partial) hydrolytic condensates thereof,

(5)

wherein $R^7$ is an unsubstituted or halo or cyano-substituted $C_1$-$C_3$ alkyl group, vinyl or phenyl, X is a hydrolyzable group, and f is 0 or 1, (I) a curing catalyst for condensation reaction, i.e., a condensation catalyst selected from alkyltin ester compounds, titanic acid esters, titanium chelate compounds, organozinc compounds, organoiron compounds, organocobalt compounds, organomanganese compounds, organoaluminum compounds, hexylamine, dodecylamine phosphate, quaternary ammonium salts, alkali metal salts of lower fatty acids, dialkylhydroxylamines, and guanidyl-containing silanes and siloxanes, and optionally (C) at least one compound selected from components (C-1) and (C-2) in an amount of 10 to 160 parts by weight per 100 parts by weight of component (A).

[(A-III) Organopolysiloxane Capped at Both Ends with Hydroxyl]

Component (A-III) is an organopolysiloxane capped at both ends with hydroxyl, represented by the general formula (4), and having a kinematic viscosity of 10 to 100,000 mm²/s at 25° C., which is used as a base polymer in the inventive silicone composition for forming a condensation cured product.

[Chem. 6]

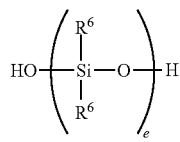

(4)

Herein $R^6$ which may be the same or different is an unsubstituted or halo or cyano-substituted $C_1$-$C_5$ alkyl group or $C_6$-$C_8$ aryl group and e is an integer of at least 1.

In formula (4), examples of $R^6$ include $C_1$-$C_7$ alkyl groups such as methyl, ethyl, propyl, butyl, pentyl, hexyl and heptyl, $C_6$-$C_8$ aryl groups such as phenyl and tolyl, and halo or cyano-substituted forms of the foregoing alkyl and aryl groups in which one or more or even all hydrogen atoms are substituted by halogen atoms (e.g., chlorine, fluorine and bromine), cyano or the like, such as chloromethyl, 3-chloropropyl, trifloromethyl and cyanoethyl, which may be used alone or in a suitable combination of two or more. The subscript e is an integer of at least 1, preferably 100 to 1,000.

[(B) Heat-Conductive Filler]

Component (B) used in the heat-conductive silicone composition of condensation reaction cure type is the heat-conductive filler (B) defined above. The amount of component (B) blended is suitably selected within the range defined above. For example, it is suitably selected from the range of 1,000 to 8,000 parts by weight or 3,000 to 6,000 parts by weight per 100 parts by weight of component (A-III).

[Component (H)]

Component (H) is at least one compound selected from silane compounds having the general formula (5), (partial) hydrolyzates and (partial) hydrolytic condensates thereof.

(5)

Herein $R^7$ is an unsubstituted or halo or cyano-substituted $C_1$-$C_3$ alkyl group or vinyl or phenyl group, X is a hydrolyzable group, and f is 0 or 1.

Component (H) serves as a crosslinker when the inventive composition is cured through condensation reaction.

In formula (5), $R^7$ is an unsubstituted or halo or cyano-substituted $C_1$-$C_3$ alkyl group such as methyl, ethyl or propyl, or vinyl or phenyl.

X is a hydrolyzable group, examples of which include alkoxy, alkoxyalkoxy, alkenyloxy, ketoxime, acyloxy, amino, amide, and aminoxy groups. Suitable alkoxy and alkoxyalkoxy groups may be halo-substituted and include, for example, methoxy, ethoxy, isopropoxy, butoxy, β-chloroethoxy, 2,2,2-trifluoroethoxy, δ-chlorobutoxy, and methoxyethoxy. An exemplary alkenyloxy group is isopropenoxy. Suitable ketoxime groups include, for example, dimethylketoxime, methylethylketoxime, and diethylketoxime. Suitable acyloxy groups include, for example, acetoxy and propionyloxy. Suitable amino groups include, for example, dimethylamino, diethylamino, n-butylamino, and cyclohexylamino. Suitable amide groups include, for example, N-methylacetamide, N-ethylacetamide, N-butylacetamide, and N-cyclohexylacetamide. Suitable aminoxy groups include, for example, N,N-dimethylaminoxy and N,N-diethylaminoxy. Preferably X is an alkenyloxy group. The subscript b is 0 or 1.

Illustrative examples of the silane compound and the (partial) hydrolyzate and (partial) hydrolytic condensate thereof include alkoxysilanes such as tetramethoxysilane, tetraethoxysilane, methyltrimethoxysilane, ethyltrimethoxysilane, vinyltrimethoxysilane, 3,3,3-trifluoropropyltrimethoxysilane, β-cyanoethyltrimethoxysilane, tetraisopropoxysilane, tetrabutoxysilane, phenyltrimethoxysilane, tetra(β-chloroethoxy)silane, tetra(2,2,2-trifluoroethoxy)silane, propyltris(δ-chlorobutoxy)silane and methyltris(methoxyethoxy)silane, alkoxysiloxanes such as ethyl polysilicate and dimethyltetramethoxydisiloxane, ketoximesilanes such as methyltris(methylethylketoxime) silane, vinyltris(methylethylketoxime)silane, phenyltris(methylethylketoxime)silane, methyltris(diethylketoxime)silane and tetra(methylethylketoxime)silane, aminosilanes such as methyltris(cyclohexylamino)silane and vinyltris(n-butylamino)silane, amidosilanes such as methyltris(N-methylacetamido)silane, methyltris(N-butylacetamido)silane and methyltris(N-cyclohexylacetamido)silane, aminoxysilanes such as methyltris(N,N-diethylaminoxy)silane, alkenyloxysilanes such as methyltri(isopropenoxy)silane, vinyltri(isopropenoxy)silane and phenyltri(isopropenoxy)silane, acyloxysilanes such as methyltriacetoxysilane and vinyltriacetoxysilane, and (partial) hydrolyzates and (partial) hydrolytic condensates thereof.

The amount of component (H) blended is preferably 1 to 40 parts, more preferably 2 to 30 parts by weight per 100 parts by weight of component (A-III).

[(I) Condensation Reaction Curing Catalyst]

Component (I) is a condensation reaction curing catalyst, that is, a condensation catalyst for curing the inventive silicone composition, selected from alkyltin ester compounds, titanic acid esters, titanium chelate compounds, organozinc compounds, organoiron compounds, organocobalt compounds, organomanganese compounds, organoaluminum compounds, hexylamine, dodecylamine phosphate, quaternary ammonium salts, alkali metal salts of lower fatty acids, dialkylhydroxylamines, and guanidyl-containing silanes and siloxanes. These compounds may be used alone or in a suitable combination of two or more.

Suitable examples of the curing catalyst include alkyltin ester compounds such as dibutyltin diacetate, dibutyltin dilaurate and dibutyltin dioctoate; titanic acid esters such as tetraisopropoxytitanium, tetra-n-butoxytitanium, tetrakis(2-ethylhexoxy)titanium, dipropoxybis(acetylacetonato)titanium and titanium isopropoxyoctylene glycol; titanium chelate compounds such as titanium diisopropoxybis(ethyl acetoacetate), titanium diisopropoxybis(methyl acetoacetate), titanium diisopropoxybis(acetylacetonate), titanium dibutoxybis(ethyl acetoacetate) and titanium dimethoxybis(ethyl acetoacetonate); organometallic compounds (i.e., zinc, iron, cobalt, manganese or aluminum) such as zinc naphthenate, zinc stearate, zinc 2-ethyloctoate, iron 2-ethylhexoate, cobalt 2-ethylhexoate, manganese 2-ethylhexoate, cobalt naphthenate and alkoxyaluminum compounds; 3-aminopropyltriethoxysilane; hexylamine; dodecylamine phosphate; quaternary ammonium salts such as benzyltriethylammonium acetate; alkali metal salts of lower fatty acids such as potassium acetate, sodium acetate and lithium oxalate; dialkylhydroxylamines such as dimethylhydroxylamine and diethylhydroxylamine; and guanidyl-containing silanes and siloxanes such as tetramethylguanidylpropyltrimethoxysilane, tetramethylguanidylpropylmethyldimethoxysilane and tetramethylguanidylpropyltris(trimethylsiloxy)silane. Of these, guanidyl-containing silanes and siloxanes such as tetramethylguanidylpropyltrimethoxysilane, tetramethylguanidylpropylmethyldimethoxysilane and tetramethylguanidylpropyltris(trimethylsiloxy)silane are preferably used.

The amount of component (I) blended is preferably 0.01 to 20 parts, more preferably 0.1 to 5 parts by weight per 100 parts by weight of component (A-III).

[Preparation Method]

Further, other additives such as internal parting agents, colorants and antioxidants may be added to the heat-conductive silicone composition of the invention as long as the objects of the invention are not compromised. The heat-conductive silicone composition may be prepared by mixing predetermined amounts of the above components.

Specifically, the heat-conductive silicone composition is prepared by a method comprising the step of mixing (A) 100 parts by weight of an organopolysiloxane, (B-I) 1,100 to 1,400 parts by weight of aluminum nitride having an average particle size of 50 µm to less than 70 µm, (B-II) 900 to 1,200 parts by weight of aluminum nitride having an average particle size of 70 µm to 90 µm, (B-III) 650 to 800 parts by weight of aluminum oxide having an average particle size of 5 µm to 15 µm, and (B-IV) 1,300 to 1,700 parts by weight of aluminum oxide having an average particle size of 0.5 µm to less than 5 µm or aluminum hydroxide having an average particle size of 0.5 µm to less than 5 µm.

More specifically, the heat-conductive silicone composition is prepared by a method comprising the step of mixing (A) 100 parts by weight of an organopolysiloxane, (B-I) 1,100 to 1,400 parts by weight of unsintered crushed aluminum nitride having an average particle size of 50 µm to less than 70 µm, (B-II) 900 to 1,200 parts by weight of unsintered crushed aluminum nitride having an average particle size of 70 µm to 90 µm or sintered spherical aluminum nitride having an average particle size of 70 µm to 90 µm, (B-III) 650 to 800 parts by weight of spherical aluminum oxide having an average particle size of 5 µm to 15 µm, and (B-IV) 1,300 to 1,700 parts by weight of crushed aluminum oxide having an average particle size of 0.5 µm to less than 5 µm or aluminum hydroxide having an average particle size of 0.5 µm to less than 5 µm.

The preferred component (B-II) is unsintered crushed aluminum nitride having an average particle size of 70 µm to 90 µm. The preferred component (B-IV) is crushed aluminum oxide having an average particle size of 0.5 µm to less than 5 µm. In this embodiment, the amount of component (B-IV) blended is more preferably 1,500 to 1,700 parts by weight.

The curing conditions for the curable silicone compositions described above include, in the embodiment wherein the heat-conductive silicone composition is of addition reaction cure type, 100° C. to 140° C., specifically 110° C. to 130° C. and 5 to 30 minutes, specifically 10 to 20 minutes; in the embodiment wherein the heat-conductive silicone composition is of condensation reaction cure type, 40° C. or lower, specifically 0° C. to 40° C. and 0.5 to 30 days, specifically 1 to 15 days; in the embodiment wherein the heat-conductive silicone composition is of organic peroxide cure type, 110° C. to 190° C., specifically 120° C. to 170° C. and 5 to 30 minutes, specifically 10 to 20 minutes.

[Cured Product]

The cured product of the heat-conductive silicone composition preferably has the following properties.

[1] Thermal Conductivity

The cured product of the heat-conductive silicone composition preferably has a thermal conductivity of at least 8 W/mK, more preferably at least 9 W/mK. A thermal conductivity of lower than 8 W/mK is achievable even with aluminum nitride having an average particle size of less than 50 µm. The upper limit is not critical and may be up to 15 W/mK, for example, though higher values are acceptable. Notably, the thermal conductivity is measured by TPA-501 (Kyoto Electronics Mfg. Co., Ltd.).

[2] Hardness

The cured product of the heat-conductive silicone composition preferably has an Asker C hardness of up to 50, more preferably from 5 to 40. When the cured product is mounted over a heat-generating part, a cured product having an Asker C hardness in excess of 50 applies stresses to the heat-generating part and cannot conform to the fine irregular contour of the heat-generating part or a cooling part, inviting a loss of thermal contact resistance.

[Dielectric Breakdown Voltage]

The cured product of the heat-conductive silicone composition preferably exhibits a dielectric breakdown voltage of at least 6 kV when it has a thickness of 1 mm. A dielectric breakdown voltage of at least 6 kV ensures insulating properties. The upper limit may be up to 25 kV though not critical.

EXAMPLES

Examples and Comparative Examples are given below for illustrating the invention, but the invention is not limited thereto.

Components (A) to (F) used in Examples and Comparative Examples are shown below.

Component (A): organopolysiloxane having the following formula (specific gravity 1.0)

[Chem. 7]

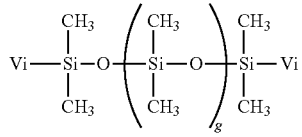

(A-1) viscosity: 100 mm²/s
(A-2) viscosity: 500 mm²/s

In the formula, Vi is vinyl and g is such a number as to give the above viscosity.

Component (B): Heat-Conductive Filler (B-1) unsintered crushed aluminum nitride with average particle size 60 µm (specific gravity 3.26): (B-I)

(B-2) unsintered crushed aluminum nitride with average particle size 80 µm (specific gravity 3.26): (B-II)

(B-3) spherical aluminum oxide with average particle size 10 µm (specific gravity 3.98): (B-III)

(B-4) crushed aluminum oxide with average particle size 1 µm (specific gravity 3.98): (B-IV)

(B-5) sintered spherical aluminum nitride with average particle size 80 µm (specific gravity 3.26): (B-II)

(B-6) unsintered spherical aluminum nitride with average particle size 40 µm (specific gravity 3.26)

(B-7) spherical aluminum oxide with average particle size 80 µm (specific gravity 3.98)

(B-8) aluminum hydroxide with average particle size 1 µm (specific gravity 2.42): (B-IV)

Component (C): Dimethylpolysiloxane Capped with Trimethoxysilyl at One End (specific gravity 1.0), represented by the following formula

[Chem. 8]

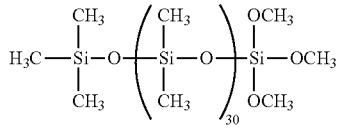

Component (D): methylhydrogenpolysiloxane having an average degree of polymerization as shown below, represented by the following formula (specific gravity 1.0)

[Chem. 9]

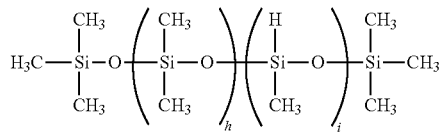

(average degree of polymerization: h=27 and i=3)

Component (E): Platinum Group Metal-Based Curing Catalyst (Specific Gravity 1.0)
Solution of 5 wt % chloroplatinic acid in 2-ethylhexanol
Component (F): Addition Reaction Inhibitor (Specific Gravity 1.0)
Ethynyl methylidene carbinol
Component (G): Peroxide-Based Curing Agent
o-Methylbenzoyl peroxide (C-23N, Shin-Etsu Chemical Co., Ltd.) (specific gravity 1.0)

Examples 1 to 6 and Comparative Examples 1 to 4

By the following methods, compositions were prepared from the above components and molded into heat-conductive molded parts. The molded parts were evaluated by the following tests. The results are shown in Tables 1 and 2.

Preparation of Silicone Composition

A heat-conductive silicone composition was prepared by feeding the predetermined amounts of components (A) to (C) into a planetary mixer and kneading for 60 minutes. Components (D) to (G) were added thereto, and the contents were kneaded for a further 30 minutes.

[Molding Method]

The resulting composition was cast into a mold and molded at 120° C. for 10 minutes on a press molding machine.

[Evaluation Tests]

Thermal Conductivity:

The composition was cured into sheets of 6 mm thick. A pair of sheets were used and measured for thermal conductivity by a thermal conductivity meter (TPA-501, Kyoto Electronics Mfg. Co., Ltd.).

Hardness:

The composition was cured into sheets of 6 mm thick. A stack of two sheets was measured by an Asker C Durometer.

Dielectric Breakdown Voltage:

The composition was cured into a sheet of 1 mm thick, which was measured for dielectric breakdown voltage according to JIS K6249.

TABLE 1

| Components (parts by weight) | | Example 1 | Example 2 | Example 3 | Example 4 | Example 5 | Example 6 |
|---|---|---|---|---|---|---|---|
| (A) | (A-1) | 100 | 100 | — | 100 | 100 | 100 |
|  | (A-2) | — | — | 100 | — | — | — |
| (B) | (B-1) | 1,250 | 1,250 | 1,000 | 1,250 | 1,250 | 1,300 |
|  | (B-2) | 1,000 | — | 1,000 | 1,000 | 1,000 | 1,100 |
|  | (B-3) | 750 | 750 | 700 | 750 | 750 | 650 |
|  | (B-4) | 1,600 | 1,600 | 1,600 | 1,600 | — | 1,500 |
|  | (B-5) | — | 1,000 | — | — | — | — |
|  | (B-6) | — | — | — | — | — | — |
|  | (B-7) | — | — | — | — | — | — |
|  | (B-8) | — | — | — | — | 1,200 | — |
| (C) | | 150 | 150 | 150 | 150 | 150 | 155 |
| (D) | | — | — | — | 12 | — | 12 |
| (E) | | — | — | — | 1.0 | — | 1.0 |
| (F) | | — | — | — | 0.2 | — | 0.2 |
| (G) | | 0.5 | 0.5 | 0.5 | — | 0.5 | — |
| Percentage of heat-conductive filler in composition (vol %) | | 83.6 | 83.6 | 82.6 | 83.0 | 84.6 | 82.6 |
| Percentage of aluminum nitride with average particle size ≥ 50 μm in heat-conductive filler (vol %) | | 54 | 54 | 51 | 54 | 47 | 58 |
| Percentage of heat-conductive filler with average particle size ≤ 5 μm in heat-conductive filler (vol %) | | 31 | 31 | 34 | 31 | 39 | 30 |
| Percentage of aspherical alumina in heat-conductive filler (vol %) | | 31 | 31 | 34 | 31 | 0 | 30 |
| Volume ratio of (aluminum nitride with average particle size from 50 μm to less than 70 μm)/ (total volume (=1) of aluminum nitride) | | 0.56 | 0.56 | 0.5 | 0.56 | 0.56 | 0.54 |
| Volume ratio of (aluminum nitride with average particle size 70-90 μm)/ (total volume (=1) of aluminum nitride) | | 0.44 | 0.44 | 0.5 | 0.44 | 0.44 | 0.46 |

TABLE 1-continued

| Components (parts by weight) | Example | | | | | |
|---|---|---|---|---|---|---|
| | 1 | 2 | 3 | 4 | 5 | 6 |
| Thermal conductivity (W/mK) | 12 | 10 | 10 | 11 | 10 | 13 |
| Hardness (Asker C) | 45 | 41 | 40 | 38 | 45 | 48 |
| Dielectric breakdown voltage (kV) | 9 | 10 | 10 | 9 | 11 | 9 |

TABLE 2

| Components (parts by weight) | | Comparative Example | | | |
|---|---|---|---|---|---|
| | | 1 | 2 | 3 | 4 |
| (A) | (A-1) | 100 | 100 | — | 100 |
| | (A-2) | — | — | 100 | — |
| (B) | (B-1) | 300 | 1,000 | — | 700 |
| | (B-2) | 240 | 500 | — | 800 |
| | (B-3) | 225 | 800 | 1,200 | 750 |
| | (B-4) | 480 | 1,600 | 1,600 | 1,600 |
| | (B-5) | — | — | — | — |
| | (B-6) | — | — | — | 550 |
| | (B-7) | — | 600 | 1,500 | — |
| | (B-8) | — | — | — | — |
| | (C) | 150 | 150 | 150 | 150 |
| | (E) | — | — | — | — |
| | (F) | — | — | — | — |
| | (G) | 0.5 | 0.5 | 0.5 | — |
| Percentage of heat-conductive filler in composition (vol %) | | 57.8 | 82.9 | 81.18 | 83.0 |
| Percentage of aluminum nitride with average particle size >50 μm in heat-conductive filler (vol %) | | 48 | 38 | 0 | 37 |
| Thermal conductivity (W/mK) | | 5 | 7 | 5 | — |
| Hardness (Asker C) | | 22 | 45 | 40 | — |
| Dielectric breakdown voltage (kV) | | 10 | 13 | 15 | — |

In Comparative Example 1 wherein aluminum nitride accounts for 48 vol % of the heat-conductive filler, but the heat-conductive filler accounts for 57.8 vol % of the composition, the cured product has an insufficient thermal conductivity. In Comparative Example 2 wherein aluminum nitride accounts for 38 vol % of the heat-conductive filler, even though the heat-conductive filler accounts for 82.9 vol % of the composition, the cured product has a low thermal conductivity as compared with a proper amount of aluminum nitride. In Comparative Example 4 using aluminum nitride having an average particle size of 40 μm, it is difficult to prepare a heat-conductive silicone composition. By contrast, in Examples wherein aluminum nitride having an average particle size of at least 50 μm is used and the volume percentage of the heat-conductive filler in the composition and the volume percentage of the aluminum nitride in the heat-conductive filler are properly selected, the heat-conductive silicone compositions afford cured products having a high thermal conductivity as well as satisfactory insulating properties.

The invention claimed is:

1. A heat-conductive silicone composition comprising (A) an organopolysiloxane as a base polymer and (B) a heat-conductive filler, wherein the heat-conductive filler (B) accounts for 60 to 85% by volume of the heat-conductive silicone composition, and aluminum nitride having an average particle size of at least 50 μm accounts for 40 to 60% by volume of the heat-conductive filler,
wherein relative to the total volume of the aluminum nitride as the heat-conductive filler which is 1, aluminum nitride having an average particle size of 50 μm to less than 70 μm is present in a volume ratio between 0.5 and 0.6, and aluminum nitride having an average particle size of 70 μm to 90 μm is present in a volume ratio between 0.4 and 0.5.

2. The heat-conductive silicone composition of claim 1 wherein the aluminum nitride is unsintered crushed aluminum nitride.

3. The heat-conductive silicone composition of claim 1 wherein a heat-conductive filler having an average particle size of up to 5 μm accounts for 25 to 45% by volume of the heat-conductive filler.

4. The heat-conductive silicone composition of claim 3 wherein the heat-conductive filler having an average particle size of up to 5 μm is crushed particles or round particles of aluminum oxide.

5. A cured product of the heat-conductive silicone composition of claim 1, having a thermal conductivity of at least 8 W/mK.

6. The cured product of claim 5, which has an Asker C hardness of up to 50.

7. The cured product of claim 5, which has a dielectric breakdown voltage of at least 6 kV at a thickness of 1 mm.

8. The heat-conductive silicone composition of claim 1 wherein the amount of component (B) is 75 to 85% by volume of the heat-conductive silicone composition.

9. A heat-conductive silicone composition comprising (A) an organopolysiloxane as a base polymer and (B) a heat-conductive filler, wherein the heat-conductive filler (B) accounts for 60 to 85% by volume of the heat-conductive silicone composition, and aluminum nitride having an average particle size of at least 50 μm accounts for 40 to 60% by volume of the heat-conductive filler, wherein the component (B) comprises, per (A) 100 parts by weight of the organopolysiloxane,
(B-I) 1,100 to 1,400 parts by weight of aluminum nitride having an average particle size of 50 μm to less than 70 μm,
(B-II) 900 to 1,200 parts by weight of aluminum nitride having an average particle size of 70 μm to 90 μm,
(B-III) 650 to 800 parts by weight of aluminum oxide having an average particle size of 5 μm to 15 μm, and
(B-IV) 1,200 to 1,700 parts by weight of aluminum oxide having an average particle size of 0.5 μm to less than 5 μm or aluminum hydroxide having an average particle size of 0.5 μm to less than 5 μm.

10. The heat-conductive silicone composition of claim 9 wherein component (B-I) is unsintered crushed aluminum nitride having an average particle size of 50 μm to less than 70 μm, component (B-II) is unsintered crushed aluminum nitride having an average particle size of 70 μm to 90 μm or sintered spherical aluminum nitride having an average particle size of 70 μm to 90 μm, component (B-III) is spherical aluminum oxide having an average particle size of 5 μm to 15 μm, and component (B-IV) is crushed aluminum oxide having an average particle size of 0.5 μm to less than 5 μm or aluminum hydroxide having an average particle size of 0.5 μm to less than 5 μm.

11. The heat-conductive silicone composition of claim 9, further comprising (C) at least one compound selected from components (C-1) and (C-2), in an amount of 10 to 160 parts by weight per 100 parts by weight of component (A), (C-1) an alkoxysilane compound having the general formula (1):

wherein $R^1$ is independently a $C_6$-$C_{15}$ alkyl group, $R^2$ is independently a substituted or unsubstituted $C_1$-$C_8$ monovalent hydrocarbon group, $R^3$ is independently a $C_1$-$C_6$ alkyl group, a is an integer of 1 to 3, b is an integer of 0 to 2, and a+b is an integer of 1 to 3, (C-2) a dimethylpolysiloxane capped with a trialkoxy group at one end of the molecular chain, having the general formula (2):

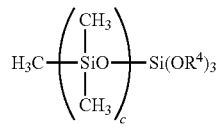

wherein $R^4$ is independently a $C_1$-$C_6$ alkyl group and c is an integer of 5 to 100.

12. A method of preparing the heat-conductive silicone composition of claim 9, comprising the step of mixing (A) 100 parts by weight of the organopolysiloxane, (B-I) 1,100 to 1,400 parts by weight of aluminum nitride having an average particle size of 50 μm to less than 70 μm, (B-II) 900 to 1,200 parts by weight of aluminum nitride having an average particle size of 70 μm to 90 μm, (B-III) 650 to 800 parts by weight of aluminum oxide having an average particle size of 5 μm to 15 μm, and (B-IV) 1,300 to 1,700 parts by weight of aluminum oxide having an average particle size of 0.5 μm to less than 5 μm or aluminum hydroxide having an average particle size of 0.5 μm to less than 5 μm.

* * * * *